(No Model.)
W. HOCHHAUSEN.
AUTOMATIC BRAKE FOR ELECTRIC MOTORS.
No. 294,041. Patented Feb. 26, 1884.
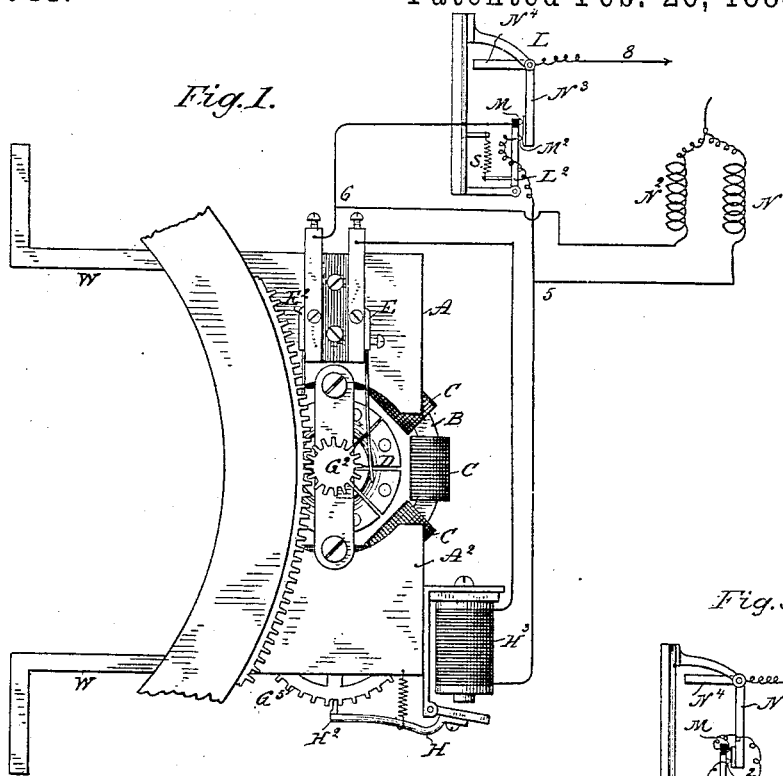
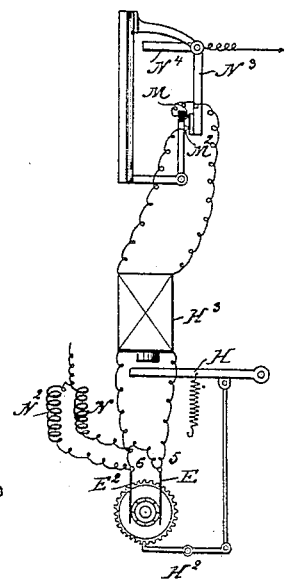
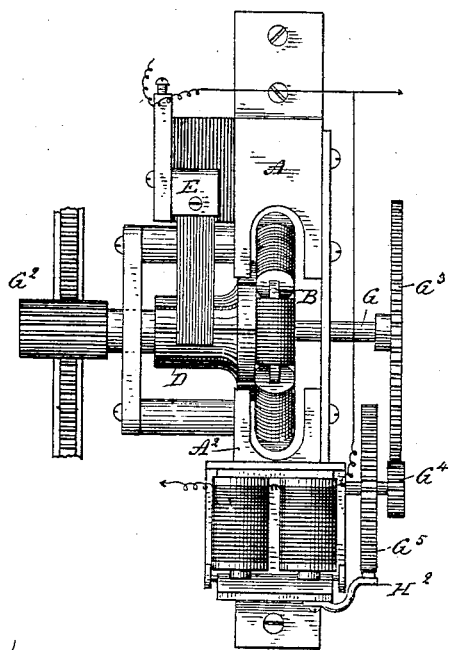
Witnesses:
Ernest Abshagen
Thos. Doomey
Inventor:
Wm Hochhausen
By his Attorney: H. C. Townsend

UNITED STATES PATENT OFFICE.

WILLIAM HOCHHAUSEN, OF NEW YORK, N. Y.

AUTOMATIC BRAKE FOR ELECTRIC MOTORS.

SPECIFICATION forming part of Letters Patent No. 294,041, dated February 26, 1884.

Application filed April 23, 1883. (No model.)

*To all whom it may concern:*

Be it known that I, WM. HOCHHAUSEN, a citizen of the United States, and a resident of New York, in the county of New York and State of New York, have invented certain new and useful Improvements in Automatic Brakes for Electric Motors, of which the following is a specification.

My invention relates to electric motors, and is designed to provide a simple and effective combination of circuits and apparatus whereby an electric motor may be quickly and promptly started or stopped.

My invention consists in the combination, with an electric motor placed in a bridge-wire between two branches of the main conductor supplying the driving-current, of an electro-magnetically-controlled brake, so arranged as to be held out of action so long as there is an excess of current in either branch of the circuit over that in the other, but to be automatically and instantly applied when the currents in the two branches are the same.

My invention consists, further, of the combination, with an electric motor in a bridge-wire, of means for admitting electric current to either branch or to both simultaneously, and an automatically-controlled brake controlled by an electro-magnet placed in the bridge-wire, whereby a series of electric motors may be worked on the same circuit, and the brake of either may be automatically applied independently of the brakes of the others.

In the accompanying drawings, Figure 1 is a side view of an electric motor, showing the application of my invention thereto and the arrangement of the switch and other apparatus. Fig. 2 is a top view of the motor and the automatic brake. Fig. 3 is a diagram illustrating an equivalent arrangement of the brake electro-magnet.

Referring to Figure 1, A $A^2$ indicate the stationary pole-pieces of an electric motor of any desired form. In the present instance I have shown my invention as applied to an electric motor built upon the principle of the Pacinotti or Gramme machine.

B indicates the ring-armature of such machine, and C C C three of the bobbins or coils on such armature.

D indicates the commutator, and E $E^2$ the commutator-brushes.

G, Fig. 2, indicates the armature-shaft, carrying at one end the pinion $G^2$, that gears with a segmental rack or a toothed wheel of any mechanism to which it is desired to impart reverse movements from the motor.

$G^3$ is a toothed wheel at the other end of the shaft G, which engages with a pinion, $G^4$, upon the shaft of which latter is a brake-wheel, $G^5$, of any suitable construction.

H indicates an armature-lever, which carries at one end a brake or stop, $H^2$, which is actuated by a spring or weight, so as to engage with the brake-wheel $G^5$ when the armature-lever is unattracted by the magnet $H^3$.

I have herein shown the wheel $G^5$ as a toothed or serrated wheel, and the break $H^2$ as a catch or detent; but it will be readily understood that the wheel $G^5$ might be an ordinary brake-wheel and the brake $H^2$ an ordinary friction-brake.

At L is indicated the switch that controls the operation of the motor, serving either to reverse or to cause the same to come to rest through the withdrawal of the electric current from it.

$L^2$ indicates a double contact-lever, having two contact-points, M $M^2$, insulated from one another. A spring, S, serves to hold the lever $L^2$ against a contact-lever, $N^3$, one of whose arms, as $N^4$, constitute the armature for an electro-magnet, or may be operated by hand or in any other desired manner. Lever $N^3$ is electrically connected by wire 8 with any suitable source of electrical supply. Insulated contact $M^2$ connects through artificial resistance N with the other pole of the battery or other generator, while contact-point M connects through artificial resistance $N^2$ with the same pole. From point 5 in one of the branches $M^2$ N a connection is taken through electro-magnet $H^3$ to commutator-brush E, while from point 6 of the other branch, M $N^2$, a connecting-wire is taken to the brush $E^2$. The electric motor and the magnet $H^3$ are thus in a bridge-wire between the two branches, including, respectively, resistance N and resistance $N^2$. The resistances depend upon the amount of resistance of the motor, and are sufficient to cause the diversion to said motor of a current that will operate the same properly. When the lever N³ is in contact with both points M M², the circuit from wire 8 is closed through both branches, including the resistances N N², and said resistances being equal to one another, the potential at points 5 6 will be equal, so that no current will pass through the electric motor and magnet H³. If, however, lever N³ be drawn to the left by the agency of the armature N⁴, or by other means, said lever will rock upon the double contact-lever L², breaking the contact with point M, but preserving contact with point M², so that there will then be two paths for the current, dividing from point 5, one of which will include resistance N, and the other of which will include the magnet H³, the electric motor, and resistance N². The electric motor will therefore be caused to operate, the amount of current diverted to it depending upon the relative resistances of the two paths. The armature H is at the same time withdrawn from the brake-wheel by the attraction of magnet H³, so as to allow the motor to turn. If, now, the lever N resume its first position, so as to make contact with both points M M², the current will cease to flow through the motor, and the attraction of magnet H³ upon its armature will instantly cease and cause the brake to engage with the brake-wheel and bring the motor instantly to rest. If, now, the lever N³ be swung to the right, owing to a decrease of pull on armature N⁴, contact with N² will be broken and contact with M preserved, so that the current branching at point 6 will pass to brush E² through the motor and magnet H³ in the reverse direction, another portion going through resistance N², which latter will in the same manner cause the diversion of current to the motor. The magnet H³ will immediately withdraw the brake, and the motor will then turn in the opposite direction until the circuit is closed through both contacts M M² simultaneously, so as to bring the motor to rest in the manner before described.

It will be observed that with the motor arranged in the bridge-wire any difference of potential between the two points of connection will cause the current to flow in one direction or the other, according to which side of the bridge has the greater potential. Theoretically, any difference whatever will cause a flow of current, and in the practical operation of the apparatus such difference of potential may arise from differences of pressure on the two contacts controlling the connection to the two branches, since with such difference of pressure there would, as is well understood by electricians, be a difference of resistance.

Fig. 3 shows an equivalent arrangement of electro-magnet H³. In this case the magnet is a differentially-wound magnet, one of whose coils is in circuit from contact M to point 5, while the other is in circuit from contact M² to point 6, but is wound in the opposite direction to the first coil, so that when the circuit is closed through both branches, as before described, the magnetism in H³ will be *nil*; but when the circuit of either coil is closed alone, the magnet will be energized, and will attract this armature, so as to withdraw the brake from the brake-wheel. The general operation is the same as in the arrangement shown in Fig. 1. I do not limit myself to any particular form of motor, or construction of electric switch, or devices for operating the latter. The said switch might be arranged to be operated by hand, if so desired. It is of course to be understood that the pole-pieces A A² are magnetic. They may be made magnetic by passing the current which operates the motor through coils of wire wound over them after the usual manner adopted with dynamo-electric machines; or they may be permanent magnets, or be magnetized by connection with the poles of some other magnet. In the present instance they are shown as formed upon the end of bracket-arms W W, of iron, constructed for attachment to the poles of a dynamo-electric machine, from which poles they derive, respectively, north and south magnetism. The rack with which pinion G² engages is supposed in the present case to be formed on the edge of the support for the commutator-brushes of the dynamo-electric machine, and the armature N⁴ to be arranged within the attractive influence of the head of the field-magnet. This is a special arrangement of devices and application of the electric motor that forms the subject of another application for patent, and is designed for the purpose of automatically regulating the current of the machine.

The arrangement of the circuits for the motor itself and the special combination therewith of the resistances and the switch do not form of themselves the subject of claims in this application, since they are claimed in other applications for patents filed by me.

It will be readily understood that with the above arrangements of the brake-magnet for the motor the action of said brake will be entirely independent of the similarly-placed brake for any other electric motor supplied from the same general circuit.

What I claim as my invention is—

1. The combination, with an electric motor placed in a bridge between two branches of a supply-conductor, of an automatic electro-magnetically-controlled brake the electro-magnet for which is placed in the bridge-wire.

2. The combination, with an electric motor placed in a bridge between two branches of a main circuit, of means for admitting current to either or both of said branches, and an electro-magnet in the bridge-wire controlling an automatic brake for the motor.

3. The combination, with an electric motor placed in a bridge-wire between two branches, of the main conductor, a resistance in each branch, a switch for admitting the electric current to either branch, and a brake for the motor controlled by an electro-magnet in the bridge-wire.

4. The combination, with an electric motor placed in a bridge-wire, of an electro-magnet in said bridge-wire, a brake for stopping the motor actuated by a spring or other power, and an electro-magnet in the bridge-wire for holding the brake out of action so long as there is an excess of current in either branch over that in the other.

5. The combination, with an electric motor, of the bibranched conductor containing artificial resistances, a bridge-wire containing an electric motor, a brake for said motor supported by an armature-lever, and an electro-magnet acting on said armature and included in the bridge-wire.

6. The combination, with an electric motor placed in a bridge-wire, of a switch for producing an inequality of flow in the two branches between which the bridge-wire is placed, and a brake for said motor controlled by an electro-magnet which is arranged to hold the brake out of action when the current in either branch prevails over that in the other.

7. The combination of the lever $N^3$, the double contact-lever $L^2$, electric motor in the bridge-wire between the branches from the double contact-lever, and a brake electro-magnet, $H^3$, substantially as and for the purpose set forth.

Signed at New York, in the county of New York and State of New York, this 14th day of April, A. D. 1883.

WILLIAM HOCHHAUSEN.

Witnesses:
　　THOS. TOOMEY,
　　GEO. C. COFFIN.